United States Patent
Wasserman

Patent Number: 5,255,213
Date of Patent: Oct. 19, 1993

[54] APPARATUS FOR PROVIDING SELECTABLE FRACTIONAL OUTPUT SIGNALS

[75] Inventor: Steven C. Wasserman, Fremont, Calif.

[73] Assignee: Apple Computer, Inc., Cupertino, Calif.

[21] Appl. No.: 965,048

[22] Filed: Oct. 21, 1992

Related U.S. Application Data

[63] Continuation of Ser. No. 635,266, Dec. 28, 1990, abandoned.

[51] Int. Cl.[5] .................. G06F 7/52; H03K 21/00
[52] U.S. Cl. ............................ 364/703; 377/49; 377/48
[58] Field of Search ............ 364/703, 701, 715.01, 364/715.02; 377/48, 49; 328/39

[56] References Cited

U.S. PATENT DOCUMENTS

| | | | |
|---|---|---|---|
| 4,078,203 | 3/1978 | Borst | 364/703 X |
| 4,991,188 | 2/1991 | Perkins | 364/703 X |

*Primary Examiner*—Jerry Smith
*Assistant Examiner*—Chuong D. Ngo
*Attorney, Agent, or Firm*—Blakely, Sokoloff, Taylor & Zafman

[57] ABSTRACT

A circuit for producing output signals which indicate a fraction of a series of input signals including apparatus for furnishing a first value equivalent to the value of a numerator of the fraction, apparatus for furnishing a second value equivalent to the value of the difference between a numerator of the fraction and a denominator of the fraction, apparatus for sequentially subtracting the second value from the first value with each input signal of the series until a result of zero or less is produced, apparatus for sequentially adding the first value to the result with each input signal of the series until a result of greater than zero is produced, and apparatus for utilizing the value of the result to indicate whether each signal of the series of input signals is to be utilized.

8 Claims, 2 Drawing Sheets

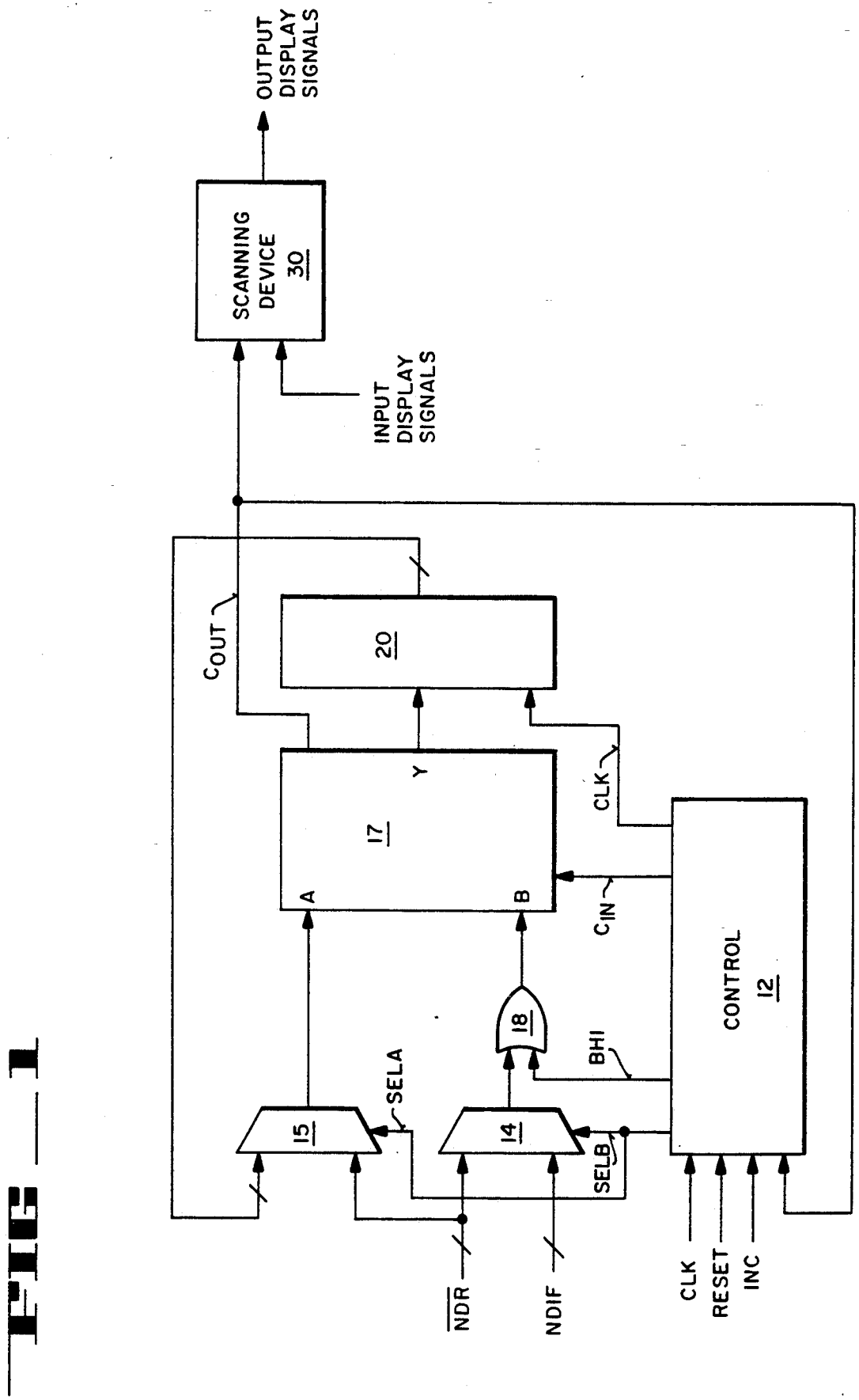
FIG — 1

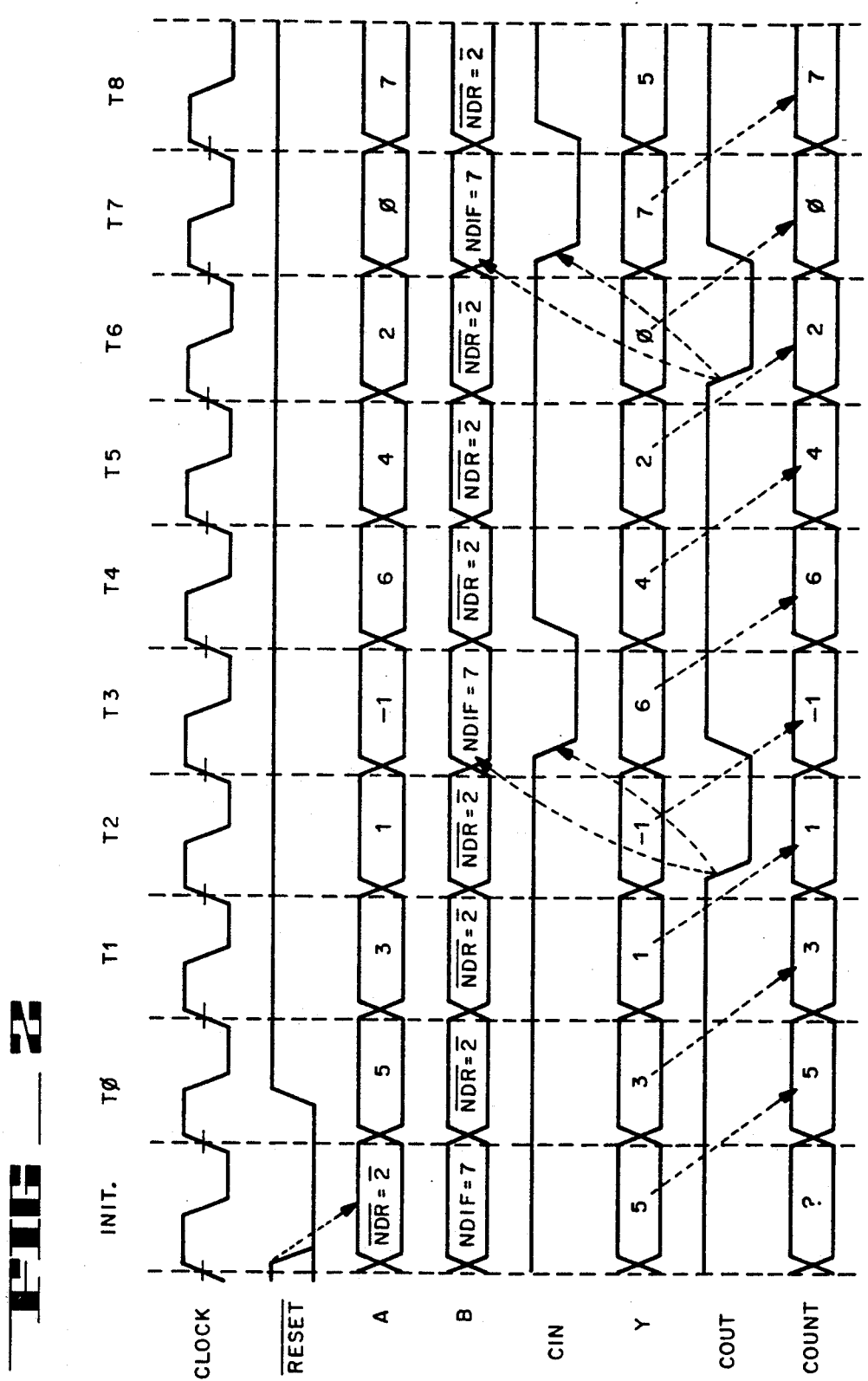

APPARATUS FOR PROVIDING SELECTABLE FRACTIONAL OUTPUT SIGNALS

This is a continuation of application Ser. No. 07/635,266, filed Dec. 28, 1990, now abandoned.

BACKGROUND OF THE INVENTION

1. Field Of The Invention

This invention relates to computer circuitry and, more particularly, to apparatus for providing output signals which are a selectable fraction of the input signals.

2. History Of The Prior Art

In computer systems and other digital circuitry there is often the need to provide signals which are some selectable fraction of a sequence of input signals. For example, in order to scale the size of an output display, it may be necessary to reduce the number of lines and pixels presented on the display. In order to accomplish this, it is useful to have a circuit which is able to utilize a count of the input lines and pixels furnished and provide an output which is a selectable fraction of that input. Such a circuit might also be readily adapted to use in providing windows of varying sizes for output displays.

SUMMARY OF THE INVENTION

It is, therefore, an object of the present invention to provide a circuit which is able to count the number of input signals and provide an arbitrary fraction of the counted signals as an output.

It is another, more specific, object of the present invention to provide a circuit which is able to count the number of input signals and provide an arbitrary fraction of the counted signals as an output and yet may be economically constructed.

These and other objects of the present invention are realized in a circuit for producing output signals which indicate a fraction of a series of input signals including apparatus for furnishing a first value equivalent to the value of a numerator of the fraction, apparatus for furnishing a second value equivalent to the value of the difference between a numerator of the fraction and a denominator of the fraction, apparatus for sequentially subtracting the second value from the first value with each input signal of the series until a result of zero or less is produced, apparatus for sequentially adding the first value to the result with each input signal of the series until a result of greater than zero is produced, and apparatus for utilizing the value of the result to indicate whether each signal of the series of input signals is to be utilized.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a block diagram illustrating the circuit of the invention.

FIG. 2 is a diagram illustrating various signals utilized in the circuit of FIG. 1.

NOTATION AND NOMENCLATURE

Some portions of the detailed descriptions which follow are presented in terms of representations of operations on data bits within a computer memory. These descriptions and representations are the means used by those skilled in the data processing arts to most effectively convey the substance of their work to others skilled in the art. The steps described are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Referring now to FIG. 1 there is shown a block diagram of a circuit 10 constructed in accordance with the invention. The circuit 10 includes what is here generally referred to as a source of control signals 12 which in the preferred embodiment may be a state machine designed in accordance with teachings well known in the art. The signals furnished by the source of control signals 12 include a system clock signal CLK (which is itself furnished to the source 12), a carry-in signal CIN which may be programmed to provide either a binary one or a zero, and a signal BHI which may be made to provide a constant series of binary ones for reasons to be explained hereinafter. The source 12 also furnishes signals SELA and SELB for controlling multiplexing in the circuit 10. The source of control signals 12 receives as an input the system clock CLK, a reset signal which indicates when operation is to commence or recommence, a signal INC which indicates which input signals are to be counted, and a signal COUT fed back from a result produced by the circuit 10.

Two other signals are provided as input to the circuit 10. These are a signal NDIF which is a signal numerically equal to the numerator of a fraction and a signal NOT_NDR which is the binary complement of the difference between the numerator and the denominator of the fraction. The fraction of interest is the fractional amount of the input count it is desired to provide as the output count. For example, if one were providing a very small window on the screen of an output display and the number of lines of pixels in that window were ten, and if one desired to reduce the number of lines to four-fifths of the input lines, then the value of the fraction would be four-fifths, NDIF would be four, and the value of NDR would be one. The signal NOT_NDR would then be the binary complement of one.

The signals NDIF and NOT_NDR are furnished to a first multiplexer 14. The signal NOT$_{13}$ NDR is also furnished to a multiplexor 15. The output of the multiplexer 15 is furnished as one of two input signals to an adder 17. The output of the multiplexer 14 is furnished to an OR gate 18 which also receives the control signal BHI as another input. The output of the OR gate 18 is transferred as the second input to the adder 17.

The adder 17 is a typical adder circuit well known to the prior art having a sufficient number of binary stages to handle the value of the signal NDIF which can be expected and any number to be added thereto. Such an adder may be utilized as a subtractor circuit as is well known to the prior art if the complement of the binary value of the subtrahend is added to the minuend and a carry-in signal of one is provided at the first stage. This is accomplished through the use of the signal CIN which provides the carry-in signal when subtracting. When the adder 17 is to be used for adding, a value of zero is furnished as the signal CIN; when the added 17 is to be used for subtracting, a value of one is furnished as the signal CIN. The adder 17 produces a carry-out signal COUT and a signal which is the sum or difference of the two input signals depending on the operation accomplished. The carry-out signal COUT is furnished as an input signal to the source of control signals 12 to control the use or non-use of the input signals which are being reduced. The sum or difference of the two input signals from the adder 17 is transferred to a register 20 which stores the value of each addition or subtraction. The value stored in the register 20 is transferred back on the next clock signal CLK as an input to the multiplexer 15.

The operation of the circuit 10 may be better understood by reference to the diagram illustrated in FIG. 2. In the example presented in FIG. 2, it is presumed that it is desired to reduce the number of some series of input signals which appear in sequential order. For example, it may be desired to reduce the number of lines which appear on an output display to some fraction of the original number of lines by dropping some of those lines so that the information may be presented on a particular output display. Thus, in order to reduce the top-to-bottom dimension on the display to seven-ninths of the original, it may be desirable to produce an output which includes only seven-ninths as many lines as the lines of pixels which are furnished for display. Alternatively, it may be desirable to reduce the number of pixels on each line of the display by seven-ninths. The circuit 10 of FIG. 1 may be used to produce an output which may control both of these operations.

It should be noted that the fraction by which the input signals are to be reduced is entirely arbitrary and may be easily varied through the provision of different values for the signals NDR and NDIF. Thus, if it is desired to produce an output which is seven-ninths of the input, the value of the signal NDIF is seven while the value of the signal NDR is two (the difference between seven and nine).

Across the top of FIG. 2 are illustrated a series of clock signals. Input signals are to appear during each of these periods and for each nine input signals which are presumed to occur in sequence, two are to be dropped so that seven signals remain. It is the function of the circuit 10 to pick which of these input signals to drop and to provide an output from which this result may be determined. It is also the purpose of the circuit 10 to select the signals to drop in a manner that, if used to produce a display output, the least distortion of the display possible (within reasonable economic constraints) will occur. Consequently, the individual signals which are to be dropped should be evenly distributed among the original signals, rather than all or a number being dropped at one point in the sequence.

At time Init, the count value held in the register 20 is indeterminate as indicated by the question mark (?) in that position. The control circuit 12 responds to an input reset signal by selecting the signal NOT_NDR through the multiplexer 15 and the signal NDIF through the multiplexor 14. The control circuit 12 also assures that the signal BHI remains low (zero) and that the signal CIN is one so that the adder 17 acts as a subtractor. Consequently, the adder 17 subtracts the values of the signal NDR from the signal NDIF (by adding the value of NOT_NDR to NDIF and adding one to the result) to produce the difference of five. This value is transferred on the Y output from the adder 17 to the storage register 20. The carry-out signal is a one indicating that the result of the subtraction is positive. This signal is used to indicate that the input signal at time t0 is not to be dropped. Thus it will be noted that the operation of the circuit 10 was to subtract the value of the signal NDR from the value of the signal NDIF and place the result in the register 20 at time t0.

This process continues. At time t1 in response to the positive value of the carry-out signal COUT, the multiplexer 15 selects the count value stored in register 20; and the multiplexer 14 selects the signal NOT_NDR. The value of the carry-out signal COUT also causes the signal BHI to remain at zero. Thus, the adder 17 receives the value of the count stored in the register 20 and subtracts from it the value of the signal NDR producing a Y output signal of three. This value is stored in the register 20. The carry-out signal COUT remains one as the value in the adder 17 is still positive. The carry-out signal indicates that the input signal is to be retained and not dropped.

The operation continues with the value of the signal NDR being subtracted from the count value remaining in the register 20 at each step until at time t3 the result of the subtraction is minus one. The carry-out signal COUT being zero or a negative value indicates that the next input signal is to be dropped. The carry-out signal COUT causes the control circuit 12 to cause the next carry-in value of signal CIN to be zero so that an add operation is performed by the adder 17. The carry-out signal COUT signals the source of control signals 12 that the values to be furnished to the adder 17 are the value of the count stored in the register 20 and the value of the signal NDIF. Thus, the sum of these values produces a Y output signal of six; and this result is stored in the register 20.

The positive result produces a positive carry-out signal COUT which causes the control circuit 12 to control the adder 17 to act as a subtractor on the next operation. The sequence of operations repeats, subtracting the value of NDR from the value of the count until the value produced by the adder 17 again goes to zero or a negative number and produces a negative carry-out signal COUT. The negative carry-out signal COUT again causes the input signal at the next time interval to be dropped and the value of the signal NDIF to again be added to the count in the register 20.

In this manner the circuit 10 produces an output which may be used to signal those input signals of a sequence which are to be included and those signals which are to be dropped from a sequence of input signals in order to obtain a desired fraction of the input sequence. Thus, the resulting signals produced by the circuit 10 may be used in scanning the output of a frame buffer to an output display, for example, to indicate pixels and lines to be dropped from the display.

There are situations in which it is desirable that the value in the register 20 be saved rather than either having some value added to it or subtracted from it. For example, when counting display lines to reduce the number, it is necessary to operate the circuit 10 controlling the line reduction only at the beginning of each line and to skip over all of the other pixels on the line. The circuit 10 uses the input signal INC to indicate that the value stored in the register 20 should be saved until the next cycle of operation. By driving the signal BHI to binary one and thus furnishing a series of binary ones to the adder 17 in its subtractive mode of operation, a value of zero is subtracted from the value held in the register 20. This allows the value in the register 20 to be cycled without change. Using this facility, the value in the register 20 may be retained for an entire display line by furnishing ones for each pixel on a line using the input signal BHI. It should be noted that the use of the signal BHI to accomplish this operation saves a multiplexer stage which would normally be used to accomplish the operation and thus is less expensive than would be expected. The use of the circuit also accelerates the operation of the circuit 10 over that using another multiplexer stage.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for producing output display signals which indicate a fraction of an image comprised of a series of lines, wherein each of said lines includes a series of input display signals corresponding to pixels, said fraction has a numerator value and a denominator value, said circuit comprising adder/subtractor means for selectively adding or subtracting two numbers, such that a result is output from the adder/subtractor means, wherein the result has either a first or second polarity, first multiplexer means coupled to the adder/subtractor means for furnishing a first value to the adder/subtractor means for selectively adding or subtracting two numbers, wherein said first value is equivalent to the numerator value of the fraction or the difference between the numerator value and the denominator value, and wherein the first multiplexer means is coupled to receive the numerator and the difference, second multiplexer means coupled to the adder/subtractor means for furnishing a second value to the adder/subtractor means for selectively adding or subtracting two numbers, wherein said second value is equivalent to the difference between the numerator value of the fraction and the denominator value of the fraction or the result feedback from the adder/subtractor means, and wherein the second multiplexer means is coupled to receive the difference and the result, means for causing the adder/subtractor means for selectively adding or subtracting to subtract the second value from the first value to produce the result, means responding to said result being greater than zero for causing the second multiplexer means for furnishing the second value to furnish the result to the adder/subtractor means and the first multiplexer means for furnishing the first value to furnish the difference between the numerator value and the denominator, and for causing the adder/subtractor means for selectively adding or subtracting to subtract the first value from the result with each of the series of input signals until the value is zero or less, means responding to said result being zero or less for causing the first multiplexer means for furnishing the first value to furnish the numerator to the adder/subtractor means and the means for furnishing the second value to furnish the result to the adder/subtractor means, and for causing the adder/subtractor means for selectively adding or subtracting to add the first value to the result, means coupled to said means for selectively adding and subtracting for sequentially repeating the result for each input display signal in a line, wherein said result is repeated for each pixel in a line when a fraction of the lines of the image are being indicated, such that the result is the same for all of the input display signals corresponding to pixels in the same line; and means coupled to receive the series of input display signals and the result for indicating whether each signal of the series of input display signals is to be utilized according to the polarity of the result, wherein the means for indicating includes means for providing output display signals, such that each signal of the series of input display signals is output by the means for providing only if the polarity of the result is the first polarity, and wherein when the result is sequentially repeated for each input display signal in the same line by the means for sequentially repeating a result, the polarity value of the result indicates whether each of the input displays signals in the line are to be utilized in the output display signals, such that the output display signals that are provided correspond to a fraction of the lines of the image.

2. A circuit for producing output display signals which indicate a fraction of an image comprised of a series of lines, wherein each of said lines includes a series of input display signals corresponding to pixels, said fraction having a numerator value and a denominator value, said circuit comprising first multiplexer means coupled to receive the numerator of the fraction, said first multiplexer for furnishing a first value equivalent to the numerator of the fraction, second multiplexer means coupled to receive the difference between the numerator and the denominator, said second multiplexer means for furnishing a second value equivalent to the difference between the numerator of the fraction and the denominator of the fraction, subtraction means coupled to the first multiplexer means and to the second multiplexer means for sequentially subtracting the second value from the first value with each input signal of the series until a result of zero or less is produced, addition means coupled to receive the result and coupled to the first multiplexer means for sequentially adding the first value to the result with each input signal of the series when the result is zero or less, such that the addition means adds the first value to the result, and wherein the subtraction means is coupled to receive the result, such that the result is substituted for the first value from which the second value is subtracted until a result of greater than zero is produced, repeating means coupled to said subtraction means, said repeating means for sequentially repeating the result for each input display signal in a line, wherein said result is repeated for each pixel in a line when a fraction of the lines of the image are being indicated, such that the result is the same for all of the input display signals corresponding to pixels in the same line; and means coupled to receive the series of input display signals and the result for indicating whether each signal of the series of input display signals is to be utilized according to the polarity of the result, wherein the means for indicating includes means for providing output display signals, such that each signal of the series of input display signals is output by the means for providing only of the result is the polarity of the result is the first polarity, and wherein when the result is sequentially repeated for each input display signal in the same line by the means for sequentially repeating a result, the polarity value of the result indicates whether each of the input displays signals in the line are to be utilized in the output display signals, such that the output display signals that are provided correspond to a fraction of the lines of the image.

3. A circuit for producing output display signals which indicate a fraction of an image comprised of a series of lines, wherein each of said lines includes a series of input display signals corresponding to pixels, said fraction has a numerator value and a denominator value, said circuit operating in a plurality of modes and comprising:

computational means for selectively adding or subtracting a first and a second value to generate a result, wherein the computational means is coupled to receive the result, such that the computation means sequentially adds or subtracts to the result;

first input means coupled to said computational means and coupled to receive said result and the difference between the denominator value and the numerator value, said first input means for furnishing said first value to said computational means, said first input means responsive to a first signal, such that if said first signal is in a first state then said first input means supplies said computational means with said result and if said first signal is in a second state then said first input means supplies said computational means with the difference between the denominator value and the numerator value;

second input means coupled to said computational means and coupled to receive the numerator value and the difference between the numerator value and the denominator value, said second input means for furnishing said second value to said computational means, said second input means responsive to said first signal, such that if said first signal is in said second state then said second input means supplies said computational means with the numerator value and if said first signal is in said first state then said second input means supplies said computational means with the difference between the denominator value and the numerator value;

first control means coupled to the computational means for causing the computational means to subtract the second value from the result with each of the series of input signals until the result is zero or less in response to the result being greater than zero and for causing the computational means to add the first value to the result in response to said result being zero or less;

second control means coupled to the first input means, the second input means and the computational means for generating said first signal, such that said first signal is in said first state when said first control means causes said computational means to subtract and said first signal is in said second state when said first control means causes said computational means to add;

third control means coupled to the computational means for causing the result to remain unchanged for each of said input display signal in a line when said circuit is in one of said modes, wherein said result is repeated for each pixel in a line when a fraction of the lines of the image are being indicated, such that the result is the same for all of the input display signals corresponding to pixels in the same line when in said one mode; and means coupled to receive the series of input display signals and the result for indicating whether each signal of the series of input display signals is to be utilized according to the polarity of the result, wherein the means for indicating includes means for providing output display signals, such that each signal of the series of input display signals is output by the means for providing only if the polarity of the result is the first polarity, and wherein when the result is sequentially repeated for each input display signal in the same line by the means for sequentially repeating a result, the polarity value of the result indicates whether each of the input displays signals in the line are to be utilized in the output display signals, such that the output display signals that are provided correspond to a fraction of the lines of the image.

4. The circuit defined in claim 3 wherein said first control means includes a carry signal from said computational means, such that if said carry signal is in a first state then said computational means performs addition and if said carry signal is in a second state then said computational means performs subtraction.

5. The circuit defined in claim 3 wherein said first input means comprises a multiplexer.

6. The circuit defined in claim 3 wherein said second input means comprises a multiplexer.

7. The circuit defined in claim 3 further comprising buffer means for storing said result from said computational means and outputting said result to said first input means.

8. A circuit for producing output signals which indicate a fraction of an image comprised of a series of lines, wherein each of said lines includes a series of input display signals corresponding to pixel, said fraction has a numerator value and a denominator value, said circuit comprising:

computational means for selectively adding or subtracting a first value and a second value to generate a result and an output signal, wherein the computational means is coupled to receive the result, such that the computational means sequentially adds or subtracts to the result;

first input means coupled to said computational means and coupled to the result and the difference between the numerator and the denominator, said first input means for furnishing said first value to said computational means, said first input means responsive to a first signal, such that if said first signal is in a first state then said first input means supplies said computational means with said result and if said first signal is in a second state then said first input means supplies said computational means with the difference between the denominator value and the numerator value;

buffer means for storing said result and supplying said result to said first input means;

second input means coupled to said computational means and coupled to receive the difference and the numerator, said second input means for furnishing said second value to said computational means, said input means including a multiplexer means and an ORing means, said second multiplexer means responsive to said output signal, such that if said output signal is in said second state then said second input means supplies said ORing means with the numerator value and if said output signal is in said first state then said second input means supplies said ORing means with the difference between the denominator value and the numerator value, wherein said ORing means is responsive to a first control signal, such that said ORing means furnishes the output of said multiplexer means to said computational means as said second value when said first control signal is in a first state and furnishes said computational means with a predetermined logical value when said first control signal is in a second state;

control means coupled to receive said output signal for supplying said output signal to said first input means, said second input means and said computational means and including means coupled to said ORing means for furnishing said ORing means with said first control signal, wherein said result is repeated for each pixel in a line when a fraction of the lines of the image are being indicated when said control means furnishes said first control signal, such that the result is the same for all of the input display signals corresponding to pixels in the same line when in said one mode; and means coupled to receive the series of input display signals and the result for indicating whether each signal of the series of input display signals is to be utilized according to the polarity of the result, wherein the means for indicating includes means for providing output display signals, such that each signal of the series of input display signals is output by the means for providing only if the polarity of the result is the first polarity, and wherein when the result is sequentially repeated for each input display signal in the same line by the means for sequentially repeating a result, the polarity value of the result indicates whether each of the input displays signals in the line are to be utilized in the output display signals, such that the output display signals that are provided correspond to a fraction of the lines of the image.

* * * * *